May 6, 1952     W. J. COTTON     2,595,227
ELECTRICAL OXIDATION OF ARALKYL HYDROCARBON
Filed Jan. 13, 1948
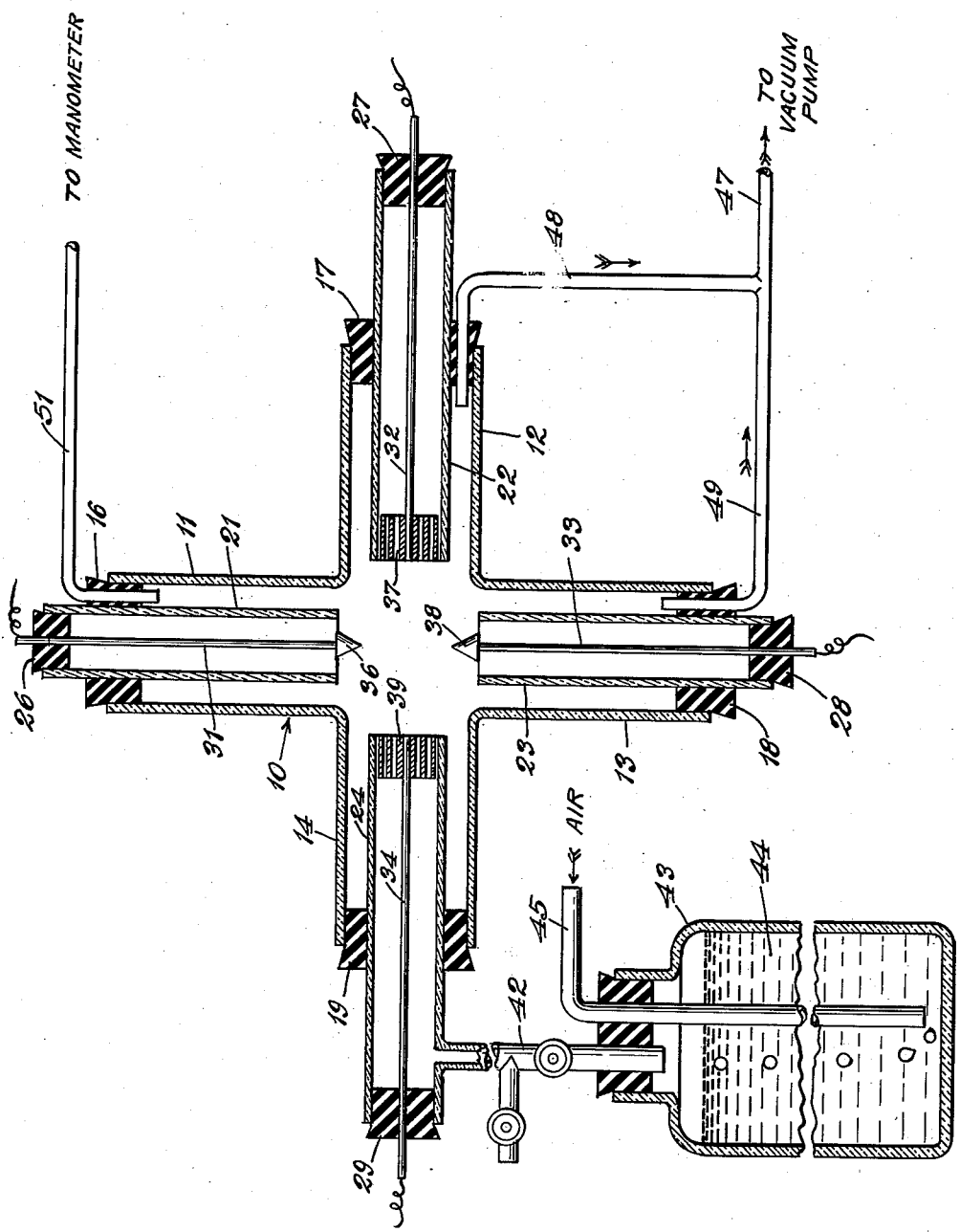
Inventor
William J. Cotton
by W. Bartlett Jones,
Attorney.

Patented May 6, 1952

2,595,227

UNITED STATES PATENT OFFICE 2,595,227

ELECTRICAL OXIDATION OF ARALKYL HYDROCARBON

William J. Cotton, Butler, Pa.

Application January 13, 1948, Serial No. 1,957

10 Claims. (Cl. 204—169)

The present invention relates to the gaseous oxidation of the alkyl group of aralkyl hydrocarbon vapor to the corresponding aldehyde and acid. It has particular reference to the oxidation of such hydrocarbon vapor by oxygen in the presence of nitrogen under the influence of an electric discharge.

It is the principal object of the present invention to pass a suitable gaseous mixture continuously through an electric-discharge in a reactor and to remove therefrom the reacted material containing the desired oxidation products.

It is an object of the invention to subject a stream of the said gases to the action of a high-frequency high tension discharge to cause and to catalyse the reaction.

It is another object of the invention to effect the reaction in a reactor with crossed electric discharges, one of which is essentially a high-frequency discharge, and the other of which is a low-frequency discharge.

It is a particular object of the invention to effect increased yields of the desired oxidation products by favorable combinations of selected ones of available optimum series of the higher-frequency discharge.

Various other and ancillary objects and advantages of the invention will become apparent from the following description and explanation of the invention, as it is set forth in connection with the exemplary reactor shown in the drawing, in which:

The figure illustrates a reactor suitable for use of one or two discharges.

The general nature of the reactor and of the variable factors affecting the one or two discharges, is already described in the literature in several articles in a series by the applicant, all appearing in Transactions of the American Electrochemical Society, volume 91.

It has now been determined that a volatile compound having a saturated aliphatic hydrocarbon radical as a substituent on an aromatic nucleus, for example, toluene, is oxidizable by the present invention at the terminal aliphatic carbon to form aldehyde and acid. Thus, toluene is converted to benzaldehyde and benzoic acid. Ethyl benzene is converted to benzylaldehyde and phenyl acetic acid. This oxidation may not be effected by the electric discharge on a mixture consisting the hydrocarbon vapor and oxygen, because carbon dioxide and water are then predominant oxidation products. But in the presence of nitrogen in such a mixture, as by use of a mixture of air and the aralkyl hydrocarbon vapor, the desired oxidation is effected, and nitrogen, is recovered with the oxidation products. In other words, the nitrogen appears to function catalytically. The present invention involves, furthermore, conduct of the process in terms of its effect upon the nitrogen. Although it is known that air under the electric discharge as here employed, is converted in part to oxides of nitrogen, it is known that air so containing such oxides of nitrogen, is substantially incapable of oxidizing the aralkyl hydrocarbon vapor to the aldehyde and acid at the same temperature and pressure conditions, where the present process is operable.

In the following description, the term "reagent mixture" is intended to signify a gaseous mixture fundamentally of an aralkyl hydrocarbon, nitrogen and oxygen, as the functioning materials, variable in proportions as to each ingredient. Argon may be present advantageously, and it increases the yield over nitrogen without argon. Air is a suitable medium to mix with the hydrocarbon vapor.

For the purpose of initial explanation, a continuous sinusoidal variable high-frequency discharge is referred to hereinafter, until equivalents thereof are explained. When such a discharge acts upon a stream of the reagent mixture it induces and controls, in part, the extent of the desired oxidation. Yields are greatest when the gaseous stream is at right angles to the line of the two electrodes between which the discharge is effected, but the discharge may parallel the direction of gaseous flow with very good results.

With equilibrium conditions established, the reaction is carried out using for the described electric discharge only sufficient energy to maintain the discharge against fluttering. This is termed the "minimum sustaining energy." Whenever circumstances are such by changed conditions, as for example, operating at the peak locations later described, the input for the discharge should be reduced to the minimum sustaining energy. The yields per volt-ampere unit resulting with variations of frequency may be plotted against frequency. The curve exhibits a base line of yield and numerous peaks of yield rising from the base line. It is thus found that there are peaks, corresponding to wave lengths in meters and to frequency in megacycles, both given in table I as follows:

TABLE I

| Wave Length (Meters) | Frequency in megacycles |
|---|---|
| 9 | 33.30 |
| 18 | 16.67 |
| 36 | 8.33 |
| 71 | 4.22 |
| 142 | 2.11 |
| 285 | 1.05 |
| 576 | .521 |

From other studies, this applicant has previously determined that under these conditions nitrogen gas is chemically activated at any one of a series of frequencies or wave lengths corresponding to the formula $l2^n$ where the letter "$l$" represents any wave length of the series, and "$n$" is a positive or negative integer including zero. This formula fits within experimental deviation the determined wave lengths in Table I.

In my said prior publications, these frequencies have been described as "critical reaction frequencies" and also as catalytic reaction frequencies. At these frequencies the reaction is speeded with the result that yield per unit of power consumption is greatly increased over those yields obtained at other frequencies on the said base-line, which latter are hereinafter referred to as base-line frequencies. The frequencies corresponding to peak yields are hereinafter referred to as reaction peak frequencies.

Accordingly, the invention contemplates operation at or in the vicinity of any one of the available reaction peak frequencies. For general purposes, these may be considered as dependent upon the reaction involved, which in the present invention is that of the reagent mixture. But it so happens that the series of peak frequencies of Table I are the same as for a mixture consisting of oxygen and nitrogen, and it is known that it is only the nitrogen and not the oxygen that is the responsive constituent. Therefore, for the present invention, nitrogen in the electric field is an oxidation catalyst at base-line frequencies, and more-highly activated nitrogen is a more effective oxidation catalyst at a reaction peak frequency.

The yield peaks referred to are not linear, nor located at exact frequencies, but have sloping sides of variable contours and intercepts with the base line which intercepts are variously spaced apart, commonly at a distance which covers a range of about 20% of the reaction peak frequency. Hence, at longer wave lengths, a wider range of deviation in meters from peak frequency is permitted to maintain the yield within the scope of the peak. The character of the peak is a function of the apparatus and the purity of the band of frequency which is for convenience numerically identified as a single frequency.

Another important variable is the character of the electrode system between which the effective discharge takes place. The shape of the electrode terminals, the distance apart, and the kind of conductor material for each electrode terminal, or of the pair, are factors. Each material has its characteristics. To study each material, both electrodes should be the same, but in practical operation they may differ. The following explanation of discharge terminal characteristics is based upon identity of material for each electrode terminal.

Extensive studies have shown that for each conductor material of the electrode terminal, whether it be a pure elemental metal or non-metal, there is one or more mathematically related series of frequencies at which the material operates most efficiently, as to yield per unit of power, and as to power consumption (work function of the material), independently of the kind of reaction. In my said publications, these have been termed "critical electrode frequencies."

Accordingly, for each pair of electrodes, that is, the terminal material, for any given reaction, the yields plotted against varying frequencies will show a base-line, with one series of peaks corresponding to the above described reaction peak frequencies and another series of peaks corresponding to the characteristics of the material of the electrodes. The two series may have entirely independent members of each, or may have members which overlap or superimpose, in the latter two cases pyramiding the yield. By changing the electrode material, a different series of electrode peaks may be introduced on the base-line. The frequencies causing the electrode peaks are hereinafter referred to as electrode peak frequencies.

In the preferred practical operation of the present invention, conditions are chosen so that there are superimposed peaks, one from each of said two series.

The electrode peak frequencies may be calculated for pure elements or be experimentally determined, and then tabulated for reference. For non-elemental materials, such as alloys, experimental determination of at least one electrode peak frequency is required. By rather precise formulas, several series of available electrode peak frequencies may be calculated from any one of them. Each pure electrode material has several series of wave lengths, corresponding to electrode peak frequencies, one or more of which series functions in any particular reaction. The shortest wave length in each series is termed the fundamental wave length of the series. These may be known or determinable independently of the reaction. For pyramiding yields at any selected reaction peak frequency, one may choose or find a suitable electrode system having a like or close electrode peak frequency. The following formula applies to elemental electrode substances:

Where L = a fundamental wave length in meters
$n'$ = a series-determinant integer which may be from 1 to at least 4 (to be confirmed experimentally)
N = the atomic number of the element $$L = \frac{n'N}{1.166 + 0.0430N}$$

The value L in the formula is convertible to frequency in megacycles by the formula:

$$\text{megacycles} = \frac{300}{\text{meters}}$$

It has been found experimentally that many electrode materials fit the formula when the value of $n'$ is 1, or 2, or 3, or 4. None has been found where $n'$ has other values. In some cases $n'$ may have only one of said values, or two or more of them.

It is, of course, to be understood that the two electrodes may be of different materials, thereby giving a set of electrode peak frequencies for each electrode. As stated above, the available electrode peak frequencies may be known or determinable independently of the reaction. When one member of a series for a given value of $n'$ functions, the remainder of the same series will function. For pyramiding yields at any selected reaction peak frequency, one may choose or find a suitable electrode system having a like or close electrode peak frequency.

Other means are available to further increase the yield, as by raising the base-line and its various peaks. By the system of crossed discharges, a second pair of lower-frequency electrodes is so placed as to discharge across, and preferably at right angles to, the higher-frequency electrodes and a discharge is effected between them. Preferably, this is parallel to the stream of gas, but it may also be at right angles to it. The second discharge adds effective energy to that supplied by the first. It permits lowering of the level of the said minimum sustaining energy. It enlargest the luminous electric field in the reactor, which is so made as to accommodate the enlargement and still confine the luminous portion by a gaseous atmosphere. Addition of the second discharge raises the described base-line of the reaction and the peaks thereof, and thus increases the yield per unit of power consumption. The best results are obtained with crossed discharges when there is substantial equality in the volt-ampere readings of the two electrode systems. When attempts are made to increase the energy input to the reactor by increasing the intensity of the higher-frequency discharge, the results are not the same as adding this energy by the cross discharge, because the additional input by way of the higher energy dissipates itself in raising the temperature of the gases in the reactor without substantially increasing the desired chemical activity.

For the lower-frequency discharge, any suitable type of discharge suffices, providing that it is lower in frequency than the higher-frequency discharge by as much as 0.065 megacycles per second. A simple 60 cycle source of electrical energy is suitable as a primary connection for a secondary voltage to effect the said lower voltage discharge. However, limitations to 60 cycles and to the sinusoidal character of the current are not critical or essential.

The pressure of gas in the reactor may vary from atmospheric to pressures above and below it, but the best results obtain at partial evacuation. In decreasing the reactor pressure from atmospheric pressure, the yield per unit of power consumption rises, passes through a peak, and then declines. The practical minimum is such as to avoid a glow discharge which fills the reactor, that is, the pressure should not go below 100 mm. of mercury. A peak on the said yield curve occurs at about 335 to 340 mm. of mercury. This peak has steep slopes, covering a preferred range from about 250 to 360 mm. of mercury.

Experience in the field of electrical reaction as employed in this invention, teaches that the results derive from quantum energy gathered from the discharge. In practice, with commercially available equipment, the form of the wave is not normally sinusoidal, but is distorted from sinusoidal to varying extents. It may be unidirectional, or alternating, with the zero axis variously located in the wave form, and it may be continuous or discontinuous. There is an energy relationship, to be discussed below, between the sinusoidal wave form and any distorted wave form.

The frequencies above discussed apply to purely sinusoidal wave forms of current and voltage. Each of these two curves may be distorted. The phase difference between a sinusoidal current and its corresponding sinusoidal voltage represents the power factor of the related load. When either curve of current or voltage, or both, is distorted, there is likewise a power factor. In the present invention, any distortion of either curve shifts the above described sinusoidal critical electrode and reaction peak frequencies to new locations.

Because the discharge employed is in the electromagnetic spectrum, at each sinusoidal frequency, the quantum of energy may be calculated by the well-known Planck's formula:

$$1 \text{ cycle per second} = 6.554 \times 10^{-27} \text{ ergs.}$$

Thus, the energy per second is predetermined by the sinusoidal frequency. Knowing the form of a distorted wave, as for example by means of an oscilloscope, its energy per cycle may be calculated. From this calculation, a new frequency for such distorted wave may be calculated which will be its equivalent sinusoidal frequency. However, this conversion from distorted to equivalent sinusoidal waves need not be calculated for it may be readily determined experimentally for any given equipment assembly.

In the practical operation of the present process, commercial wave generators are employed, many of which yield distorted power waves. Each such generator may be calibrated to determine a frequency therefrom which corresponds to any chosen sinusoidal frequency. Experimentally, it has been determined that for every distorted wave, there is a series of reaction peak frequencies and a series of electrode peak frequencies, which are mathematically related within the series by the same formulas which apply to the similar series of sinusoidal frequencies. This statement assumes constant distortion. Thus, corresponding to each wave generator to be used, there is merely a mathematical shift of the critical frequencies to maintain equality of energy input per unit of time. With this relationship any wave form may be described in terms of its sinusoidal equivalent.

In the drawing there is shown an illustrative reactor in which the single discharge or the crossed discharges may be employed. Conveniently, it is a hollow 4-legged reactor 10, whose legs of tubular form are preferably at right angles to each other and are open at their extremities, thus providing at the intersection the main reaction chamber. These legs are designated clockwise in the drawing as 11, 12, 13 and 14. Preferably it is of glass or other non-conducting ceramic material. The four legs are closed by apertured closure members 16, 17, 18 and 19, for example, by rubber stoppers in the forms as shown. Passing through a main aperture of each such closure is a tubular sheath of glass or like material, designated 21, 22, 23 and 24. These sheaths in the reactor terminate close to the intersection and at their other extremities are plugged by suitable closure members 26, 27, 28 and 29, which may again be rubber stoppers. Through the closure members 26 through 28, extend electrodes 31, 32, 33 and 34, respectively provided with discharge terminals 36, 37, 38 and 39. Terminals 36 and 38 are those between which the high-frequency discharge preferably takes place, while electrodes 37 and 39 are those across which the optional lower-frequency discharge preferably takes place. As illustrated, electrodes 37 and 39 are spaced farther apart than electrodes 36 and 38.

Electrodes 37 and 39 are what have been termed perforated button-type electrodes, having a series of perforations preferably parallel with the carrying electrode stems 32 and 34. In the arrangement shown the button-type electrode 39 serves as a dispersing inlet for the gaseous reagent mixture. The latter is introduced to the sheath 24 by a conduit 42 connected to a container 43 having a liquid containing the aralkyl hydrocarbon 44 to be introduced as vapor into the reactor. For example, the liquid 44 designated in container 43 may be pure toluene. A conduit 45 carries air to a location in the container 43 below the level of the liquid 44 so as to pick up the desired vapor from liquid 44 as air is drawn through the liquid and into the reactor. The temperature of liquid 44 may be used as one control over the content of the hydrocarbon vapor for the reactor.

A vacuum pump is provided (not shown) to which a conduit 47 leads from the reactor. Conduit 47 is divided into a branch 48 entering the leg 12 by way of its closure 17, and a branch 49 entering the leg 13 by way of its closure 18. The apparatus is so arranged that the leg 13 is lowermost, whereby any liquids which may condense on the inside walls of the reactor are drawn therefrom through the connection 49.

For the purpose of measuring and controlling the pressure within the reactor, a tubular connection 51 enters the uppermost leg 11 by way of its closure 16, and this leads to a measuring manometer. Means for controlling the rate of flow is not indicated.

The oxidation effected by the present invention occurs in the alkyl group, and in the case of toluene and ethyl benzene at the terminal carbon atom of the alkyl substituent. The aryl radical is resistant to the oxidation, whereby, in the case of toluene, benzaldehyde and benzoic acid are formed.

For normal temperatures of 20° to 30° C. within the reactor, and for a partial pressure of the hydrocarbon at not over 25%, toluene, ethylbenzene and their homologs may be used, as well as polyalkyl deratives of benzene. For example, the three xylenes oxidize to their respective mono- and di-carboxylic acid derivatives and their intermediate aldehydes.

When air is employed, which is preferred, it may beneficially retain its normal contents, especially its moisture and carbon dioxide. However, other mixtures of oxygen and nitrogen may be employed, having from 5 to 50 volumes of oxygen to 95 to 50 volumes of nitrogen.

From the foregoing description, it will be understood that the selection of pressure for the reactor, the temperature, the proportion of the hydrocarbon in the reaction mixture, and the composition as to oxygen, nitrogen and minor ingredients found in air, may be varied over a wide range. For each operation, they are preferably chosen for maximum yields, in combination with proper choices of electrodes and of frequency for the one or more discharges employed, as already described.

In the following examples, the frequencies are given in the terms of the sinusoidal frequency equivalents:

*Example 1.*—A mixture of normal air is drawn through a suitably long column (about two feet in height) of toluene liquid at a temperature of 20° to 65° C., thereby to enrich the air with toluene vapor up to a content of about 25% by volume. This corresponds to a partial pressure of toluene of 25%. This enriched air constitutes the reagent mixture, which is to be passed into the reactor maintained by the vacuum pump at the optimum pressure range extending from 250 to 360 mm. of mercury. However, before introducing the mixture, the reactor is brought into equilibrium conditions of operation which are chosen for the process while a current of air at 475 to 500 cc. per minute (calculated at normal temperature and pressure) passes through the reactor. This supply of air is gradually changed to the reaction mixture, by a suitable mixing device not shown. About five minutes time for such change-over is sufficient. The arrangement is such as to permit entry of the reaction mixture into the reactor at a temperature below the ignition temperature of the mixture, to avoid an explosion.

As illustrated, the reaction mixture is then introduced through the button-type electrode 39 at a rate of approximately 475 to 500 cc. per minute, calculated at normal temperature and pressure. The reaction gases pass out of the reactor through pipe 48 and any liquid which may condense passes out through connection 49 along with a content of gas. No temperature control is provided. The discharge yields very little heat.

Between the electrodes 36 and 38 is passed a discharge at minimum sustaining energy at a sinusoidal frequency equivalent to 142 meters. The electrodes 36 and 38, for this example, are tantalum, which does not exhibit any electrode-peak-frequency in the vicinity of said 142 meters. With the electrodes spaced at about 17 mm. the volt-amperes for the electrode system ranges from 30 to 35.

The discharged material is cooled and condensed thereby to separate a gaseous phase of nitrogen depleted in its original content of oxygen, and a liquid phase containing unreacted toluene, benzaldehyde and benzoic acid. Expressed in terms of benzoic acid, the yield is about 48 grams per kilo-volt-ampere-hour (k. v. a. h.). The power factor is in the neighborhood of 0.6, which increases the yield to about 80 grams in terms of benzoic acid per kilowatt-hour (k. w. h.).

*Example 2.*—In Example 1, the electrodes are changed either to copper, or to copper carrying up to 2% of lithium. The frequency is maintained at said 142 meters. Either set of the new electrodes exhibits a characteristic copper-electrode-peak frequency at approximately 142 meters. This superimposes two peaks and effects an increase in yield to about 80 grams per k. v. a. h. The power factor is about 0.4. This corresponds to a yield of 120 grams in terms of benzoic acid per k. w. h.

*Example 3.*—The aim here is to operate on a base-line frequency without an electrode-peak frequency and without a reaction peak frequency. The electrodes 36 and 38 are tantalum, and the frequency is 400 meters. This gives a lower yield of about 32 grams per hour in terms of benzoic acid per k. v. a. h. The power factor is 0.8. This corresponds to a yield of 40 grams of product in terms of benzoic acid per k. w. h.

*Example 4.*—The aim here is to operate above the base-line without a reaction peak and with an electrode-peak-frequency. The electrodes 36 and 38 in Example 3 are changed to either copper or said copper-lithium as in Example 2. The frequency employed is 216 meters. This is a suitable electrode-peak-frequency for the said electrodes, and it does not lie in the series of reaction peak-frequencies. The yield is approximately 40 grams in terms of benzoic acid per k. v. a. h. The power factor is 0.8. This raises the yield to 50 grams per k. w. h.

*Examples 5 to 8.*—These examples are modifications of Examples 1 to 4 in which a 60-cycle discharge is passed between electrodes 37 and 39 spaced at 21 to 28 mm. when the electrodes 36 and 38 are at 17 mm. The intensity of the discharge is adjusted so that the volt-ampere input is approximately equal to the volt-ampere input to the electrodes 36 and 38. The addition of the second discharge crossing the first permits the lowering of the energy input characterizing Examples 1 to 4 for maintaining the minimum sustaining energy. As a result the yields per unit of power consumption are considerably increased above the corresponding Examples 1 through 4. The differential lessens with deviation of the energy input to electrodes 37 and 39 from substantial equality with the input to electrodes 36 and 38 at adjusted operating conditions.

From the foregoing description and examples it is to be understood that any assembly of apparatus may be calibrated with respect to the reaction with a given set of conditions and electrodes, which latter may differ within a pair. With the variables all fixed except frequency, the latter may be changed to find a yield-frequency curve. This will show its base-line portions and its peak portions. By changing to characteristically different electrodes and repeating the reaction peaks will remain, the first electrode peaks will go and new electrode peaks will appear. From such studies one may experimentally fix desirable controls to secure high yields and efficient operation. Accordingly, the invention is not to be considered as limited to the critical frequencies pointed out herein as more advantageous than base-line frequencies. The base-line frequencies are comparable to a lighted highway on which this invention operates, and the critical frequency peaks correspond to one or more localized sources of light where the lighting is above average.

Various other modifications of the process are contemplated as falling within the scope of the invention as set forth in the appended claims.

I claim:

1. The method which comprises passing a gaseous mixture primarily of toluene vapor, oxygen and nitrogen at a temperature below its ignition temperature through an electric field of two crossing discharges exhibiting a luminous region completely confined by gas, one discharge being an electromagnetic electric discharge of relatively higher frequency and the other being a discharge of less frequency by at least 0.065 megacycles per second expressed as sinusoidal-frequency equivalents, whereby to activate the nitrogen to an oxidation catalyst and thereby oxidizing toluene to benzaldehyde and benzoic acid.

2. The method which comprises continuously introducing into and through an electric discharge reaction chamber at a pressure above 100 mm. of mercury, a reagent mixture containing primarily toluene vapor, oxygen and nitrogen at a temperature below its ignition temperature, there being from 5 to 50 volumes of oxygen to 95 to 50 volumes of nitrogen and the toluene being present up to a partial vapor pressure of 25% of the reagent mixture, passing through a first electrode system and between electrode terminals thereof located in said chamber a first electromagnetic electric discharge having a luminous portion completely confined by gas, simultaneously passing through a second electrode system between electrode terminals thereof located in said chamber a second electric discharge crossing the first discharge, the second discharge having a less frequency than the first discharge by at least 0.065 megacycles per second expressed as sinusoidal frequency equivalents, whereby the nitrogen is activated by said discharge to an oxidation catalyst for the oxygen to oxidize the methyl group of the toluene to form benzaldehyde and benzoic acid, condensing organic constituents of the material leaving the chamber, whereby to separate gas containing nitrogen and liquid containing residual toluene, benzaldehyde and benzoic acid.

3. The method which comprises continuously introducing into and through an electric discharge reaction chamber at a pressure in the range from 250 to 360 mm. of mercury, a reagent mixture containing primarily toluene vapor, oxygen and nitrogen at a temperature below its ignition temperature, there being from 5 to 50 volumes of oxygen to 95 to 50 volumes of nitrogen and the toluene being present up to a partial vapor pressure of 25% of the reagent mixture, passing through a first electrode system and between electrode terminals thereof located in said chamber a first electromagnetic electric discharge having a luminous portion completely confined by gas, simultaneously passing through a second electrode system between electrode terminals thereof located in said chamber a second electric discharge crossing the first discharge, the second discharge having a less frequency than the first discharge by at least 0.065 megacycles per second expressed as sinusoidal frequency equivalents, whereby the nitrogen is activated by said discharge to an oxidation catalyst for the oxygen to oxidize the methyl group of the toluene to form benzaldehyde and benzoic acid, condensing organic constituents of the material leaving the chamber, whereby to separate gas containing nitrogen and liquid containing residual toluene, benzaldehyde and benzoic acid.

4. The method which comprises continuously introducing into and through an electric discharge reaction chamber at a pressure in the range from 250 to 360 mm. of mercury, a reagent mixture containing primarily toluene vapor, oxygen and nitrogen at a temperature below its ignition temperature, there being from 5 to 50 volumes of oxygen to 95 to 50 volumes of nitrogen and the toluene being present up to a partial pressure of 25% of the pressure of the reagent mixture, passing through a first electrode system and between electrode terminals located in said chamber a first electromagnetic discharge having a luminous portion completely confined by gas at a peak frequency for the reacting system, simultaneously passing through a second electrode system between electrode terminals thereof located in said chamber a second electric discharge crossing the first discharge, the second discharge having a less frequency than the first discharge by at least 0.065 megacycles per second expressed as sinusoidal frequency equivalents, whereby nitrogen is activated by said discharge to an oxidation catalyst for the oxygen to oxidize the methyl group of the toluene to form benzaldehyde and benzoic acid, condensing organic constituents from the material leaving the chamber, whereby to separate gas containing nitrogen and liquid containing residual toluene, benzaldehyde and benzoic acid.

5. The method which comprises continuously introducing into and through an electric discharge reaction chamber at a pressure in the range from 250 to 360 mm. of mercury, a reagent mixture containing primarily toluene vapor, oxygen and nitrogen at a temperature below its ignition temperature, there being from 5 to 50 volumes of oxygen to 95 to 50 volumes of nitrogen and the toluene being present up to a partial pressure of 25% of the pressure of the reagent mixture, passing through a first electrode system and between electrode terminals thereof located in said chamber a first electromagnetic discharge having a luminous portion completely confined by gas at a reaction peak frequency of the said reagent mixture, simultaneously passing through a second electrode system between electrode terminals thereof located in said chamber a second electric discharge crossing the first discharge, the second discharge having a less frequency than the first discharge by at least 0.065 megacycles per second expressed as sinusoidal frequency equivalents, whereby nitrogen is activated by said discharge to an oxidation catalyst for the oxygen to oxidize the methyl group of the toluene to form benzaldehyde and benzoic acid, condensing organic constituents from the material leaving the chamber, whereby to separate gas containing nitrogen and liquid containing residual toluene, benzaldehyde and benzoic acid.

6. The method which comprises continuously introducing into and through an electric discharge reaction chamber at a pressure in the range from 250 to 360 mm. of mercury, a reagent mixture containing primarily toluene vapor, oxygen and nitrogen at a temperature below its ignition temperature, there being from 5 to 50 volumes of oxygen to 95 to 50 volumes of nitrogen and the toluene being present up to a partial pressure of 25% of the pressure of the reagent mixture, passing through a first electrode system and between electrode terminals thereof located in said chamber a first electromagnetic discharge having a luminous portion completely confined by gas at an electrode peak frequency of the electrode system, simultaneously passing through a second electrode system between electrode terminals thereof located in said chamber a second electric discharge crossing the first discharge, the second discharge having a less frequency than the first discharge by at least 0.065 megacycles per second expressed as sinusoidal frequency equivalents, whereby nitrogen is activated by said discharge to an oxidation catalyst for the oxygen to oxidize the methyl group of the toluene to form benzaldehyde and benzoic acid, condensing organic constituents from the material leaving the chamber, whereby to separate gas containing nitrogen and liquid containing residual toluene, benzaldehyde and benzoic acid.

7. The method which comprises continuously introducing into and through an electric discharge reaction chamber at a pressure in the range from 250 to 360 mm. of mercury, a reagent mixture containing primarily toluene vapor, oxygen and nitrogen at a temperature below its ignition temperature, there being from 5 to 50 volumes of oxygen to 95 to 50 volumes of nitrogen and the toluene being present up to a partial pressure of 25% of the pressure of the reagent mixture, passing through a first electrode system and between electrode terminals thereof located in said chamber a first electromagnetic discharge having a luminous portion completely confined by gas at a frequency corresponding to one of the series of reaction peak frequencies and also to one of the electrode peak frequencies of the electrode system, simultaneously passing through a second electrode system between electrode terminals thereof located in said chamber a second electric discharge crossing the first discharge, the second discharge having a less frequency than the first discharge by at least 0.065 megacycles per second expressed as sinusoidal frequency equivalents, whereby nitrogen is activated by said discharge to an oxidation catalyst for the oxygen to oxidize the methyl group of the toluene to form benzaldehyde and benzoic acid, condensing organic constituents from the material leaving the chamber, whereby to separate gas containing nitrogen and liquid containing residual toluene, benzaldehyde and benzoic acid.

8. The method which comprises oxidizing the methyl group of toluene to benzaldehyde and benzoic acid by subjecting a normally inert mixture of vapor of the hydrocarbon and oxygen at a temperature below the ignition temperature for the mixture to the influence of electrically activated nitrogen gas as an oxidation catalyst for the reaction within a field of crossed electric discharges of which one is an electromagnetic discharge having a frequency greater than the frequency of the other by at least 0.065 megacycles per second expressed as sinusoidal-frequency equivalents.

9. The method which comprises subjecting a gaseous mixture primarily of toluene vapor, oxygen and nitrogen at a temperature below the ignition temperature for the mixture to the action of crossed electric discharges of which the luminous field is completely defined by gas, one being an electromagnetic discharge having a frequency greater than the frequency of the other by at least 0.065 megacycles per second expressed as sinusoidal-frequency equivalents, whereby to activate the nitrogen to an oxidation catalyst and thereby oxidizing toluene to benzaldehyde and benzoic acid.

10. The method which comprises passing a gaseous mixture primarily of toluene vapor, oxygen and nitrogen at a temperature below its ignition temperature through an electric field of two crossing discharges exhibiting a luminous region completely confined by gas, one discharge being an electromagnetic electric discharge of relatively higher frequency which when expressed as sinusoidal-frequency equivalents corresponds to a wave length expressed by the formula $l2n$ wherein $l$ is approximately 9 meters and $n$ is a positive or negative integer or zero, and the other being a discharge of less frequency by at least 0.065 megacycles per second expressed as sinusoidal-frequency equivalents, whereby to activate the nitrogen to an oxidation catalyst and thereby oxidizing toluene to benzaldehyde and benzoic acid.

WILLIAM J. COTTON.

REFERENCES CITED

The following references are of record in the file of this patent:

UNITED STATES PATENTS

| Number | Name | Date |
|---|---|---|
| 1,601,500 | Island | Sept. 28, 1926 |
| 1,909,215 | Nashau | May 16, 1933 |
| 1,939,018 | Odell | Dec. 12, 1933 |
| 1,985,875 | Harter | Dec. 25, 1934 |
| 2,097,769 | Mitscherling | Nov. 2, 1937 |
| 2,106,780 | Whittier | Feb. 1, 1938 |
| 2,468,177 | Cotton | Apr. 26, 1949 |

OTHER REFERENCES

The Chemistry of Petroleum Derivatives by Carleton Ellis, 1934, vol. I, pages 918, 919, 921.

Transactions of the Electrochemical Society, vol. 47 (1925), pages 101–112; vol. 91 (1947), pages 407–417, 532, 533, 539, 540 546.

Chemical Abstracts 32 (1938) pages 7823, (abstract of Prilezhaeva and Noether.)